(12) United States Patent
Zhang et al.

(10) Patent No.: US 9,714,198 B2
(45) Date of Patent: Jul. 25, 2017

(54) METHOD FOR PREPARING TITANIUM NITRIDE-TITANIUM DIBORIDE-CUBIC BORON NITRIDE COMPOSITE MATERIAL

(71) Applicant: HOHAI UNIVERSITY, Nanjing, Jiangsu (CN)

(72) Inventors: Jianfeng Zhang, Jiangsu (CN); Yuping Wu, Jiangsu (CN); Sheng Hong, Jiangsu (CN); Wenmin Guo, Jiangsu (CN)

(73) Assignee: HOHAI UNIVERSITY, Nanjing, Jiangsu (CN)

( * ) Notice: Subject to any disclaimer, the term of this patent is extended or adjusted under 35 U.S.C. 154(b) by 18 days.

(21) Appl. No.: 15/100,857

(22) PCT Filed: Jun. 27, 2014

(86) PCT No.: PCT/CN2014/080949
§ 371 (c)(1),
(2) Date: Jun. 1, 2016

(87) PCT Pub. No.: WO2015/188404
PCT Pub. Date: Dec. 17, 2015

(65) Prior Publication Data
US 2016/0297713 A1    Oct. 13, 2016

(30) Foreign Application Priority Data
Jun. 9, 2014  (CN) .......................... 2014 1 0253601

(51) Int. Cl.
*C04B 35/5831*    (2006.01)
*C04B 35/645*    (2006.01)
(Continued)

(52) U.S. Cl.
CPC .... *C04B 35/5831* (2013.01); *C04B 35/58014* (2013.01); *C04B 35/6262* (2013.01);
(Continued)

(58) Field of Classification Search
CPC .............. C04B 35/583; C04B 35/5831; C04B 35/58014; C04B 35/6455;
(Continued)

(56) References Cited

U.S. PATENT DOCUMENTS 4,334,928 A * 6/1982 Hara ......................... B22F 7/06
428/552
4,788,166 A * 11/1988 Araki .................. C04B 35/5831
501/96.4
(Continued)

FOREIGN PATENT DOCUMENTS

CN    101084169    12/2007
CN    101560624    10/2009
(Continued)

OTHER PUBLICATIONS

Machine translation of CN 102765705.*
International Search Report filed in PCT/CN2014/080949.

Primary Examiner — Nahida Sultana
(74) Attorney, Agent, or Firm — Rankin, Hill & Clark LLP

(57) ABSTRACT

A method for preparing a titanium nitride-titanium diboride-cubic boron nitride composite material is disclosed. Titanium powder and cubic boron nitride raw powders are mixed by a planetary ball milling method, and then the titanium nitride-titanium diboride-cubic boron nitride composite material is prepared through the steps of wet mixing, drying, sieving, pre-sintering through a high-temperature vacuum furnace, cold isostatic press molding and high-temperature sintering.

6 Claims, 1 Drawing Sheet

(51) Int. Cl.
*C04B 35/58* (2006.01)
*C04B 35/626* (2006.01)

(52) U.S. Cl.
CPC .. *C04B 35/62615* (2013.01); *C04B 35/62655* (2013.01); *C04B 35/645* (2013.01); *C04B 35/6455* (2013.01); *C04B 2235/386* (2013.01); *C04B 2235/3813* (2013.01); *C04B 2235/3886* (2013.01); *C04B 2235/404* (2013.01); *C04B 2235/5436* (2013.01); *C04B 2235/6562* (2013.01); *C04B 2235/6567* (2013.01); *C04B 2235/661* (2013.01); *C04B 2235/80* (2013.01); *C04B 2235/96* (2013.01)

(58) Field of Classification Search
CPC ...... C04B 2235/3813; C04B 2235/386; C04B 2235/661
USPC .......................................................... 264/661
See application file for complete search history.

(56) References Cited

U.S. PATENT DOCUMENTS

| | | | | |
|---|---|---|---|---|
| 5,536,485 | A * | 7/1996 | Kume | B01J 3/062 419/11 |
| 6,238,449 | B1 * | 5/2001 | Woo | B24D 3/28 51/295 |
| 7,867,438 | B2 * | 1/2011 | Can | C04B 35/5831 419/10 |
| 7,939,186 | B2 * | 5/2011 | Takaoka | C22C 26/00 428/216 |
| 8,017,225 | B2 * | 9/2011 | Takaoka | C23C 14/0641 428/216 |
| 8,034,153 | B2 * | 10/2011 | Marchiando | B22F 3/115 419/12 |
| 8,318,082 | B2 * | 11/2012 | Can | C04B 35/5831 419/10 |
| 9,120,707 | B2 * | 9/2015 | Matsuda | C04B 35/5831 |
| 9,186,726 | B2 * | 11/2015 | Keane | B22F 7/02 |
| 2007/0148496 | A1 * | 6/2007 | Takaoka | C23C 14/0641 428/698 |
| 2007/0227299 | A1 * | 10/2007 | Marchiando | B22F 3/115 75/244 |
| 2007/0275268 | A1 * | 11/2007 | Takaoka | C22C 26/00 428/698 |
| 2008/0115424 | A1 * | 5/2008 | Can | C09K 3/1445 51/309 |
| 2009/0080986 | A1 * | 3/2009 | Can | C04B 35/5831 407/119 |
| 2010/0009839 | A1 * | 1/2010 | Can | C04B 35/117 501/87 |
| 2012/0042576 | A1 * | 2/2012 | Can | C04B 35/5831 51/309 |
| 2012/0230786 | A1 * | 9/2012 | Matsuda | C04B 35/6262 407/119 |
| 2014/0077125 | A1 * | 3/2014 | Lin | C09K 5/14 252/75 |
| 2014/0087210 | A1 * | 3/2014 | Keane | B22F 7/02 428/810 |
| 2014/0165474 | A1 * | 6/2014 | Yee | C04B 35/5831 51/307 |

FOREIGN PATENT DOCUMENTS

CN 102765705 11/2012
WO 2006/046124 5/2006

* cited by examiner

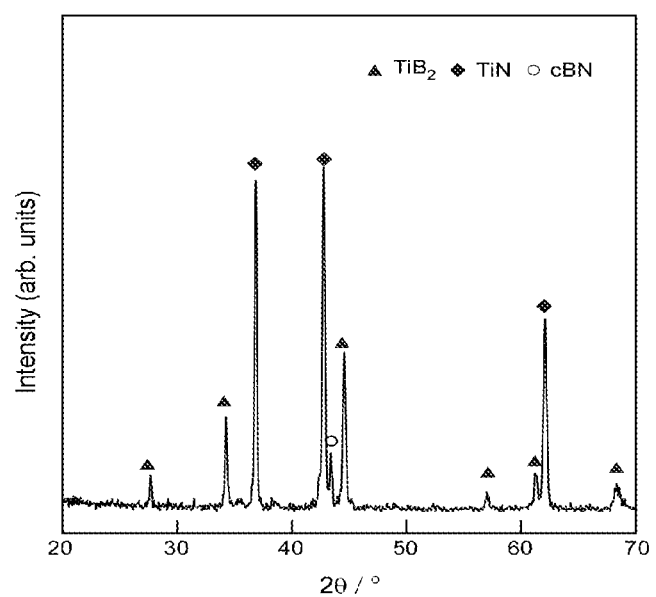

METHOD FOR PREPARING TITANIUM NITRIDE-TITANIUM DIBORIDE-CUBIC BORON NITRIDE COMPOSITE MATERIAL

TECHNICAL FIELD

The invention relates to the field of reactive sintering molding in material processing engineering, in particular to a method for preparing a titanium nitride-titanium diboride-cubic boron nitride composite material.

BACKGROUND

Titanium nitride (TiN), titanium diboride (TiB$_2$) and titanium carbide (TiC) and the like have high hardness, high abrasion resistance, good high-temperature oxidation resistance, etc., and thus they are often used as cutter materials and abrasion-resistant components and the like. To further improve hardness and abrasion resistance of TiN, TiB$_2$ and TiC and the like to meet the high-speed cutting requirements, some researchers adopted materials such as cubic boron nitride to serve as an added phase to prepare the composite material. In about 1950's, artificial diamond micro-powder and artificial cubic boron nitride (cBN) micro-powder were sintered into polycrystalline blocks large in size to serve as cutter materials in the USA, the South Africa, the former Soviet Union, Japan, etc. At the beginning of 1970's, composite sheets of cBN and hard alloy were provided, and the composite sheets were formed by sintering or pressing a layer of PCD or PcBN which was 0.5-1 mm thick on hard alloy base matrix, so that the problems that a superhard cutter material is low in bending strength and has welding-on difficulty are solved, and the application of superhard cutters enters into a practical stage. In 1980, Wentorf et al in the GE Corporation reported their results in the aspects of diamond and cBN material sintering (Science, 208(1980)873-880), that is, the dense diamond-cBN material was prepared by adopting the ultrahigh pressure conditions. In January 2013, Professor Tian Yong-jun in Yanshan University published an academic paper (Nature, 493 (2013) 385-388) on Nature and further used boron nitride particles with similar onion structures to prepare nanoscale cubic boron nitride with the hardness exceeding diamond, and the cubic boron nitride has become the hardest substance in the world. At present, the cBN cutter material is prepared substantially by sintering cBN micro-powder and bonding agents (such as Co, Al, Ti and TiN) at 1300-1900° C. under the pressure of 4-8 GPa; the cost is high, the yield is low, and the product shape and size are limited. Moreover, cBN cutters are also subject to some limitation in use. For example, the cBN cutters are high in brittleness, poor in intensity and toughness and not suitable for intermittent surface processing under impact load. It becomes a hot issue people are concerned about recently how to use cBN to serve as a hard phase to improve hardness and toughness and the like of other cutter materials. Due to the introduction of a superhard cBN phase, not only can the hardness and abrasion resistance of a TiN-TiB2 composite material be improved remarkably, but also the superhard cBN serves as superhard particles in the composite material to result in crack deflection, and accordingly the toughness of the material can be further improved.

At present, in order to prepare a composite material containing a cBN phase, materials are mixed by dry mixing or ball milling methods mostly, and then undergo pressure sintering. For example, Rong et al placed cBN powder, TiN powder and Al powder in an agate mortar to perform dry mixing for 1-2 h, and then performed high-pressure sintering (Diamond and Related Materials 11 (2002) 280-286). In their authorized patent (with the authorized notification number of CN101560624B), Zhang Rui et al mixed cubic boron nitride and bonding agents and then performed ball milling, and the ball milling time was 4-20 hours; after the ball milling, the powder was dried and sieved, undergoes cold press molding and was sintered to obtain a finished product. It is difficult to achieve uniform dispersion between all phases. Besides, even if there are sintering auxiliaries, the sintering temperature is high, which easily causes the cBN phase to be converted towards hexagonal boron nitride (hBN). Hexagonal boron nitride (hBN) serves as a soft phase, with a crystal structure and hardness similar to those of graphite, and accordingly the phase change from cBN to hBN causes reduction of material hardness and deterioration of cutting performance. In addition, the volume change resulting from phase change may cause the reduction of material density, and may also cause the reduction of the abrasion resistance of the cutter material. As a result, the service life of the cutter is further shortened. Yoshida et al from Japan (Journal of Materials Research, 1997, 12(3), pp 585-588) adopted a molten salt method to coat cBN with a TiN-TiB$_2$ coating and then obtained a titanium nitride-titanium diboride-cubic boron nitride (TiN-TiB$_2$-cBN) composite material by performing sintering for 30 min under the pressure of 5.5 GPa at about 1450° C. However, this method is time consuming and complex, and molten salt has high toxicity against experimenters.

SUMMARY

The invention provides a titanium nitride-titanium diboride-cubic boron nitride composite material and a preparation method thereof, so as to solve the problems of complexity in steps and dispersion unevenness in existing preparation methods. To solve the aforementioned technical problems, the invention provides a method for preparing a titanium nitride-titanium diboride-cubic boron nitride composite material, which comprises the following steps of:
(1) adopting Ti powder and cubic boron nitride (cBN) powder as raw materials, and utilizing in-situ reaction to prepare the titanium nitride-titanium diboride-cubic boron nitride composite material, wherein the reaction equation is as follows:

$$(1-x)\text{Ti} + \frac{2+x}{3}c\text{BN} \rightarrow \frac{2(1-x)}{3}\text{TiN} + \frac{(1-x)}{3}(\text{TiB})_2 + xc\text{BN}, \quad (I)$$

wherein x is the mole content of cBN, and the weights of the Ti powder and cBN powder are calculated according to the following formulas:

$$V_{TiN} = (1 - V_{cBN}) \times \left( \frac{\frac{2 \times M_{TiN}}{\rho_{TiN}}}{\frac{2 \times M_{TiN}}{\rho_{TiN}} + \frac{M_{TiB2}}{\rho_{TiB2}}} \right), \quad (II);$$

$$V_{TiB2} = (1 - V_{cBN}) \times \left( \frac{\frac{M_{TiB2}}{\rho_{TiB2}}}{\frac{2 \times M_{TiN}}{\rho_{TiN}} + \frac{M_{TiB2}}{\rho_{TiB2}}} \right), \quad (III);$$

-continued $$W_{Ti} = W \times \frac{V_{TiN} \times \rho_{TiN} \times \frac{M_{Ti}}{M_{TiN}} + V_{TiB2} \times \rho_{TiB2} \times \frac{M_{Ti}}{M_{TiB2}}}{V_{TiN} \times \rho_{TiN} + V_{TiB2} \times \rho_{TiB2} + V_{cBN} \times \rho_{cBN}};$$ (IV)

$$W_{cBN} = W - W_{Ti};$$ (V)

wherein $V_{cBN}$, $V_{TiN}$ and $V_{TiB2}$ are volume contents of the products cBN, TiN and TiB$_2$ respectively; $W_{Ti}$ and $W_{cBN}$ are weights of the raw materials titanium powder and cBN respectively; $M_{TiN}$, $M_{TiB2}$ and $M_{Ti}$ are molar molecular weights of TiN, TiB$_2$ and Ti respectively; $\rho_{cBN}$, $\rho_{TiN}$ and $\rho_{TiB2}$ are the theoretical densities of the products cBN, TiN and TiB$_2$ respectively;

weighing the Ti powder and the cBN powder of the aforementioned calculated amounts, adopting a planetary ball milling method to mix the materials, adding the materials into a solvent to perform wet mixing to obtain slurry, drying the obtained wet mixing slurry in a rotary drying instrument, and obtaining evenly dispersed mixed raw material powder after sieving;

(2) pre-sintering the mixed powder obtained through the step (1) in a high-temperature vacuum furnace three times;

(3) causing the pre-sintered powder in the step (2) to undergo cold isostatic press molding and then undergo high-temperature sintering;

(4) after the high-pressure sintering in the step (3) is ended, cooling the high-temperature vacuum furnace to normal temperature and pressure, and taking out a sample;

wherein the particle size of the Ti powder is not larger than 10 microns, and the purity of the Ti powder is not less than 98%; the particle size of the cBN powder is 1-10 microns, and the purity of the cBN powder is not less than 99%.

Preferably, the particle size of the Ti powder is 5 microns, and the purity of the Ti powder is not less than 98%; the particle size of the cBN powder is 6 microns, and the purity of the cBN powder is not less than 99%.

Preferably, the particle size of the Ti powder is 5 microns, and the purity of the Ti powder is not less than 98%; the particle size of the cBN powder is 10 microns, and the purity of the cBN powder is not less than 99%.

Preferably, the particle size of the Ti powder is 10 microns, and the purity of the Ti powder is not less than 98%; the particle size of the cBN powder is 1 micron, and the purity of the cBN powder is not less than 99%.

Preferably, the particle size of the Ti powder is 2 microns, and the purity of the Ti powder is not less than 98%; the particle size of the cBN powder is 5 microns, and the purity of the cBN powder is not less than 99%.

Preferably, the particle size of the Ti powder is 2 microns, and the purity of the Ti powder is not less than 98%; the particle size of the cBN powder is 1 micron, and the purity of the cBN powder is not less than 99%.

Particularly, in the step (1), the conditions of material mixing in the planetary ball milling method are that the rotating speed is 100-300 rpm, the ball-to-powder weight ratio is (3:1)-(5:1), and the ball milling time is 12-24 h.

In the step (1), the solvent used in wet mixing is alcohol or acetone.

In the step (1), the conditions of drying the wet mixing slurry in the rotary drying instrument are that the wet mixing slurry is dried for 2-5 h at 100-150° C.

In the step (1), the dried wet mixing slurry is sieved through a 50-200-mesh sieve.

In the step (2), the conditions of performing pre-sintering each time are that the powder is sintered for 1.5-2 h at 700-900° C. and then ground.

In the step (3), the conditions of cold isostatic press molding at room temperature are 0.2-0.5 GPa.

In the step (3), the conditions of high-temperature sintering are that the temperature rises to 1200-1500° C. at a speed of 3-10° C./min, and heat preservation is performed for 1-3 h under the pressure of 4-8 GPa.

By adopting the metal titanium powder and cBN as initial powder, the invention provides a preparation method which is simple to operate and has easiness in process condition control.

Beneficial effects: The method for preparing the titanium nitride-titanium diboride-cubic boron nitride composite material has the advantages that compared with the prior art, (1) the Ti powder and the cBN powder are adopted according to the invention to serve as raw materials, and the raw materials of different particle sizes and ratios are adopted rationally; the in-situ reaction is utilized to prepare the titanium nitride-titanium diboride-cubic boron nitride composite material, the uniform dispersion between all generated phases can be achieved through phase reaction, and the problem that the material is poor in impact resistance is solved; (2) due to the in-situ reaction between the titanium powder and cubic boron nitride, the interface bonding force among cubic boron nitride, titanium nitride and titanium diboride is high, and the mechanical properties of the composite material, such as intensity, are improved; (3) extra heat is provided through the direct exothermal reaction of the titanium powder and the cubic boron nitride powder, so that the material densification can be performed at a low temperature, and the energy consumption and preparation cost are reduced.

BRIEF DESCRIPTION OF THE DRAWINGS

FIG. 1 is an X-ray diffraction (XRD) graph of a titanium nitride-titanium diboride-cubic boron nitride composite material prepared according to an embodiment 1.

DETAILED DESCRIPTION

According to the invention, the titanium powder (with the purity greater than 98% and the grain size less than 10 microns) and cubic boron nitride (with a purity of about 99% and an average grain size of 1-10 microns) serve as raw materials. The Ti powder and the cBN powder are adopted as the raw materials, and the in-situ reaction is utilized to prepare the titanium nitride-titanium diboride-cubic boron nitride composite material. The reaction equation is as follows:

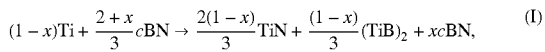

$$(1-x)\text{Ti} + \frac{2+x}{3}c\text{BN} \rightarrow \frac{2(1-x)}{3}\text{TiN} + \frac{(1-x)}{3}(\text{TiB})_2 + xc\text{BN},$$ (I)

wherein x is the mole content of cBN, and the weights of the Ti powder and cBN powder are calculated according to the following formulas:

$$V_{TiN} = (1 - V_{cBN}) \times \left( \frac{\frac{2 \times M_{TiN}}{\rho_{TiN}}}{\frac{2 \times M_{TiN}}{\rho_{TiN}} + \frac{M_{TiB2}}{\rho_{TiB2}}} \right),$$ (II)

$$V_{TiB2} = (1 - V_{cBN}) \times \left( \dfrac{\dfrac{M_{TiB2}}{\rho_{TiB2}}}{\dfrac{2 \times M_{TiN}}{\rho_{TiN}} + \dfrac{M_{TiB2}}{\rho_{TiB2}}} \right); \quad \text{(III)}$$

$$W_{Ti} = W \times \dfrac{V_{TiN} \times \rho_{TiN} \times \dfrac{M_{Ti}}{M_{TiN}} + V_{TiB2} \times \rho_{TiB2} \times \dfrac{M_{Ti}}{M_{TiB2}}}{V_{TiN} \times \rho_{TiN} + V_{TiB2} \times \rho_{TiB2} + V_{cBN} \times \rho_{cBN}}; \quad \text{(IV)}$$

$$W_{cBN} = W - W_{Ti}; \quad \text{(V)}$$

wherein $V_{cBN}$, $V_{TiN}$ and $V_{TiB2}$ are volume contents of the products cBN, TiN and TiB$_2$ respectively; $W_{Ti}$ and $W_{cBN}$ are weights of the raw materials Ti powder and cBN respectively; $M_{TiN}$, $M_{TiB2}$ and $M_{Ti}$ are molar molecular weights of TiN, TiB$_2$ and Ti respectively; and $\rho_{cBN}$, $\rho_{TiN}$ and $\rho_{TiB2}$ are the theoretical densities of the products cBN, TiN and TiB$_2$ respectively.

This calculation method is adopted in the following embodiments.

Embodiment 1

Commercially available titanium powder (with a purity greater than 99% and a grain size of 5 microns) and cubic boron nitride (with a purity of 99% and an average grain size of 10 microns) undergo raw material powder weighing according to the ratio design that the volume content of cBN in an end product is 20%, wherein the titanium powder weighs 6.33 g, and the cubic boron nitride powder weighs 3.67 g. The materials are mixed by a planetary ball milling method, the rotating speed is 100 rpm, the ball-to-powder weight ratio is 5:1, the ball milling time is 12 h, and wet mixing is performed in alcohol. The obtained wet mixing slurry is dried for 10 h in a rotary drying instrument and is finally sieved through a 200-mesh sieve to obtain evenly dispersed mixed raw material powder; the raw material powder is presintered in a high-temperature vacuum furnace three times; the pre-sintering for each time comprises the steps of performing sintering for 2 h at 700° C. and then evenly grinding the powder, so that one-time pre-sintering is finished, and the aforementioned steps are repeated twice to finish the pre-sintering three times. The presintered and ground powder undergoes cold press molding at 0.5 GPa, and then undergoes high-pressure sintering, i.e., the powder is heated to 1200° C. at a speed of 5° C./min, and then heat preservation is performed for 1 h under the pressure of 4 GPa. After the sintering experiment is finished, the temperature and pressure are reduced, and a sample is taken out. The volume content of cubic boron nitride in the obtained titanium nitride-titanium diboride-cubic boron nitride composite material is 20%.

Embodiment 2

Commercially available titanium powder (with a purity of 98.5% and a grain size of 2 microns) and cubic boron nitride (with a purity of 99% and an average grain size of 5 microns) undergo raw material powder weighing according to the ratio design that the volume content of cBN in an end product is 30%. The total mass of the titanium powder and cubic boron nitride is 10 g, wherein the titanium powder weighs 5.72 g, and the cubic boron nitride powder weighs 4.28 g. The materials are mixed by a planetary ball milling method, the rotating speed is 200 rpm, the ball-to-powder weight ratio is 5:1, the ball milling time is 24 h, and wet mixing is performed in acetone. The obtained wet mixing slurry is dried for 10 h in a rotary drying instrument and is finally sieved through a 200-mesh sieve to obtain evenly dispersed mixed raw material powder; the raw material powder is presintered in a high-temperature vacuum furnace three times; the pre-sintering for each time comprises the steps of performing sintering for 1.5 h at 800° C. and then evenly grinding the powder, so that one-time pre-sintering is finished, and the aforementioned steps are repeated twice to finish the pre-sintering three times. The presintered and ground powder undergoes cold press molding at 0.5 GPa, and then undergoes high-pressure sintering, i.e., the powder is heated to 1300° C. at a speed of 8° C./min, and then heat preservation is performed for 2 h under the pressure of 5 GPa. After the sintering experiment is finished, the temperature and pressure are reduced, and a sample is taken out. The volume content of cubic boron nitride in the obtained composite material is 30%.

Embodiment 3

Commercially available titanium powder (with a purity of 99% and a grain size of 1 micron) and cubic boron nitride (with a purity of 99% and an average grain size of 6 microns) undergo raw material powder weighing according to the ratio design that the volume content of cBN in an end product is 45%. The total mass of the titanium powder and cubic boron nitride is 10 g, wherein the titanium powder weighs 4.73 g, and the cubic boron nitride powder weighs 5.27 g. The materials are mixed by a planetary ball milling method, the rotating speed is 200 rpm, the ball-to-powder weight ratio is 5:1, the ball milling time is 24 h, and wet mixing is performed in alcohol or acetone. The obtained wet mixing slurry is dried for 10 h in a rotary drying instrument and is finally sieved through a 200-mesh sieve to obtain evenly dispersed mixed raw material powder; the raw material powder is presintered in a high-temperature vacuum furnace three times; the pre-sintering for each time comprises the steps of performing sintering for 2 h at 900° C. and then evenly grinding the powder, so that one-time pre-sintering is finished, and the aforementioned steps are repeated twice to finish the pre-sintering three times. The presintered and ground powder undergoes cold press molding at 0.4 GPa, and then undergoes high-pressure sintering, i.e., the powder is heated to 1400° C. at a speed of 10° C./min, and then heat preservation is performed for 3 h under the pressure of 6 GPa. After the sintering experiment is finished, the temperature and pressure are reduced, and a sample is taken out. The theoretical volume content of cubic boron nitride in the obtained composite material is 45%.

Embodiment 4

Commercially available titanium powder (with a purity of 99% and a grain size of 2 microns) and cubic boron nitride (with a purity of 99% and an average grain size of 1 micron) undergo raw material powder weighing according to the ratio design that the volume content of cBN in an end product is 60%. The total mass of the titanium powder and cubic boron nitride is 10 g, wherein the titanium powder weighs 3.63 g, and the cubic boron nitride powder weighs 6.37 g. The materials are mixed by a planetary ball milling method, the rotating speed is 300 rpm, the ball-to-powder weight ratio is 5:1, the ball milling time is 24 h, and wet mixing is performed in alcohol or acetone. The obtained wet mixing slurry is dried for 10 h in a rotary drying instrument and is finally sieved through a 200-mesh sieve to obtain evenly dispersed mixed raw material powder; the raw material powder is presintered in a high-temperature vacuum furnace three times; the pre-sintering for each time comprises the steps of performing sintering for 1.5 h at 800° C. and then evenly grinding the powder, so that one-time pre-sintering is finished, and the aforementioned steps are repeated twice to finish the pre-sintering three times. The presintered and ground powder undergoes cold press molding at 0.3 GPa, and then undergoes high-pressure sintering, i.e., the powder is heated to 1400° C. at a speed of 5° C./min, and then heat preservation is performed for 2 h under the pressure of 7 GPa. After the sintering experiment is finished, the temperature and pressure are reduced, and a sample is taken out. The theoretical volume content of cubic boron nitride in the obtained composite material is 60%.

Embodiment 5

Commercially available titanium powder (with a purity of 99% and a grain size of 2 microns) and cubic boron nitride (with a purity of 99% and an average grain size of 1 micron) undergo raw material powder weighing according to the ratio design that the volume content of cBN in an end product is 70%. The total mass of the titanium powder and cubic boron nitride is 10 g, wherein the titanium powder weighs 2.83 g, and the cubic boron nitride powder weighs 7.17 g. The materials are mixed by a planetary ball milling method, the rotating speed is 200 rpm, the ball-to-powder weight ratio is 5:1, the ball milling time is 24 h, and wet mixing is performed in alcohol or acetone. The obtained wet mixing slurry is dried for 10 h in a rotary drying instrument and is finally sieved through a 200-mesh sieve to obtain evenly dispersed mixed raw material powder; the raw material powder is presintered in a high-temperature vacuum furnace three times; the pre-sintering for each time comprises the steps of performing sintering for 2 h at 800° C. and then evenly grinding the powder, so that one-time pre-sintering is finished, and the aforementioned steps are repeated twice to finish the pre-sintering three times. The presintered and ground powder undergoes cold press molding at 0.5 GPa, and then undergoes high-pressure sintering, i.e., the powder is heated to 1500° C. at a speed of 8° C./min, and then heat preservation is performed for 2 h under the pressure of 8 GPa. After the sintering experiment is finished, the temperature and pressure are reduced, and a sample is taken out. The volume content of cubic boron nitride in the obtained composite material is 70%.

TABLE 1

Density, hardness, toughness and intensity and the like of TiN—TiB$_2$-cBN composite material according to embodiments 1-5

| Embodiment | cBN volume content | Relative density/% | Hardness/GPa | Fracture toughness/MPa m$^{1/2}$ | Bending strength/MPa |
|---|---|---|---|---|---|
| 1 | 20% | 95.2 | 22 | 4.2 | 630 |
| 2 | 30% | 96.5 | 24 | 5.7 | 850 |
| 3 | 45% | 95.3 | 35 | 6.0 | 890 |
| 4 | 60% | 98.8 | 42 | 5.2 | 900 |
| 5 | 70% | 97.9 | 45 | 4.8 | 820 |

In conclusion, according to the invention, the Ti powder and the cBN powder are adopted to serve as raw materials, and the raw materials of different particle sizes and ratios are adopted rationally; the in-situ reaction is utilized to prepare the titanium nitride-titanium diboride-cubic boron nitride composite material, and the uniform dispersion between all generated phases can be achieved through phase reaction; due to the in-situ reaction between the titanium powder and cubic boron nitride, the interface bonding force among cubic boron nitride, titanium nitride and titanium diboride is high, and the mechanical properties of the composite material, such as intensity, are improved; extra heat is provided through the direct exothermic reaction of the titanium powder and the cubic boron nitride powder, so that the material densification can be performed at a low temperature, and the energy consumption and preparation cost are reduced.

The invention claimed is:

1. A method for preparing a titanium nitride-titanium diboride-cubic boron nitride composite material having a desired volume content of cubic boron nitride, cBN product, and using an in-situ reaction represented by the following formula (I):

$$(1-x)\text{Ti} + \frac{2+x}{3}\text{cBN} \rightarrow \frac{2(1-x)}{3}\text{TiN} + \frac{(1-x)}{3}(\text{TiB})_2 + x\text{cBN}, \quad \text{(I)}$$

wherein x is a mole fraction of cBN product in the composite material, the method comprising:
(1) calculating weights of titanium, Ti powder and cBN powder to be used as raw materials in the reaction of formula (I) based on a desired volume content of cBN product in the composite material, and based on a desired total weight of Ti powder and cBN powder to be used as the raw materials in the reaction of formula (I),
and according to the following formulas (II)-(V):

$$V_{TiN} = (1 - V_{cBN}) \times \left( \frac{\frac{2 \times M_{TiN}}{\rho_{TiN}}}{\frac{2 \times M_{TiN}}{\rho_{TiN}} + \frac{M_{TiB2}}{\rho_{TiB2}}} \right), \quad \text{(II)}$$

$$V_{TiB2} = (1 - V_{cBN}) \times \left( \frac{\frac{M_{TiB2}}{\rho_{TiB2}}}{\frac{2 \times M_{TiN}}{\rho_{TiN}} + \frac{M_{TiB2}}{\rho_{TiB2}}} \right); \quad \text{(III)}$$

$$W_{Ti} = W \times \frac{V_{TiN} \times \rho_{TiN} \times \frac{M_{Ti}}{M_{TiN}} + V_{TiB2} \times \rho_{TiB2} \times \frac{M_{Ti}}{M_{TiB2}}}{V_{TiN} \times \rho_{TiN} + V_{TiB2} \times \rho_{TiB2} + V_{cBN} \times \rho_{cBN}}; \quad \text{(IV)}$$

-continued $$W_{cBN} = W - W_{Ti}; \quad \text{(V)}$$

wherein $V_{cBN}$ is the desired volume content of cBN product in the composite material; W is the desired total weight of Ti powder and cBN powder used as the raw materials in the reaction of formula (I); $V_{TiN}$ and $V_{TiB2}$ are calculated volume contents of the products TiN and TiB$_2$ respectively in the composite material; $W_{Ti}$ and $W_{cBN}$ are the calculated weights of the raw materials Ti powder and cBN powder respectively; $M_{TiN}$, $M_{TiB2}$ and $M_{Ti}$ are molar molecular weights of TiN, TiB$_2$ and Ti respectively; $\rho_{cBN}$, $\rho_{TiN}$ and $\rho_{TiB2}$ are the theoretical densities of the products cBN, TiN and TiB$_2$ respectively;

weighing the calculated weights of the raw materials Ti powder and the cBN powder, mixing the calculated weights of the raw materials using a planetary ball mill, adding a solvent to the mixed raw materials and performing wet mixing to obtain a slurry, drying the slurry in a rotary drying instrument to obtain a dried mixture, and sieving the dried mixture to obtain an evenly dispersed mixed raw material powder;

(2) pre-sintering the mixed raw material powder obtained in step (1) in a high-temperature vacuum furnace three times to produce a pre-sintered powder, wherein pre-sintering includes heating the mixed raw material powder for 1.5-2 h at 700-900° C. and then grinding the mixed raw material powder;

(3) subjecting the pre-sintered powder obtained in step (2) to cold isostatic press molding performed at 0.2-0.5 GPa, and then to high-temperature sintering by increasing a temperature inside the high-temperature vacuum furnace at a rate of 3-10° C./min to 1200-1500° C., and then maintaining the temperature inside the high-temperature vacuum furnace at 1200-1500° C. for 1-3 h at a pressure of 4-8 GPa;

(4) after the high-temperature sintering in step (3) is ended, cooling the high-temperature vacuum furnace to normal temperature and pressure, thereby providing a titanium nitride-titanium diboride-cubic boron nitride composite material.

2. The method for preparing the titanium nitride-titanium diboride-cubic boron nitride composite material according to claim 1, wherein the particle size of the Ti powder is lower than 10 microns, and the purity of the Ti powder is not less than 98%; the particle size of the cBN powder is 1-10 microns, and the purity of the cBN powder is no less than 99%.

3. The method for preparing the titanium nitride-titanium diboride-cubic boron nitride composite material according to claim 1, wherein in step (1), the raw materials are mixed in the planetary ball mill at a rotating speed of 100-300 rpm, at a ball-to-powder weight ratio of (3:1)-(5:1), and for a ball milling time of 12-24 h.

4. The method for preparing the titanium nitride-titanium diboride-cubic boron nitride composite material according to claim 1, wherein in step (1), the solvent used in wet mixing is alcohol or acetone.

5. The method for preparing the titanium nitride-titanium diboride-cubic boron nitride composite material according to claim 1, wherein in step (1), the slurry is dried in the rotary drying instrument for 2-5 h at 100-150° C.

6. The method for preparing the titanium nitride-titanium diboride-cubic boron nitride composite material according to claim 1, wherein in step (1), the dried mixture is sieved through a 50-200-mesh sieve.

* * * * *